March 12, 1929.　　　C. L. RUSSELL　　　1,704,903
DOUGH DIVIDER
Filed Nov. 21, 1925　　　2 Sheets-Sheet 1

Inventor:
CHARLES L. RUSSELL,
By John H. Bruninga
His Attorney.

March 12, 1929.   C. L. RUSSELL   1,704,903
DOUGH DIVIDER
Filed Nov. 21, 1925    2 Sheets-Sheet 2

Inventor:
CHARLES L. RUSSELL,

Patented Mar. 12, 1929.

1,704,903

UNITED STATES PATENT OFFICE.

CHARLES L. RUSSELL, OF ST. LOUIS, MISSOURI, ASSIGNOR TO AMERICAN BAKERS MACHINERY COMPANY, OF ST. LOUIS, MISSOURI, A CORPORATION OF MISSOURI.

DOUGH DIVIDER.

Application filed November 21, 1925. Serial No. 70,568.

This invention pertains to bakers machinery and more particularly to dough dividers such as are used for portioning dough into quantities suitable for loaves of bread and the like.

In the operation of this type of machines, and particularly dough handling machines used in connection with bread making, the proper lubrication of the dough itself as it passes through the machine is an important factor. The sticking of dough to parts of the machine must be prevented not only in order that equal portions may be turned out by the machine, but in order that the machine itself shall not become clogged with dough. If the machine should become clogged and then allowed to stand idle for a period sufficient to permit the dough to become dry and hard, the machine parts become securely cemented together so that starting is difficult. Under such conditions it has happened that driving parts of the machine have been broken in an attempt to start up after allowing the machine to become stuck with dough.

One of the objects of this invention, therefore, is to provide means for lubricating the dough in its passage through the machine in all parts thereof so that there will be no tendency for the dough to adhere to any part to cause sticking when the machine stands idle.

Another object of this invention is to provide proper lubrication for certain machine elements which have caused special trouble from sticking.

Further objects will appear from the following description taken in connection with the accompanying drawing of which:

Figure 1:
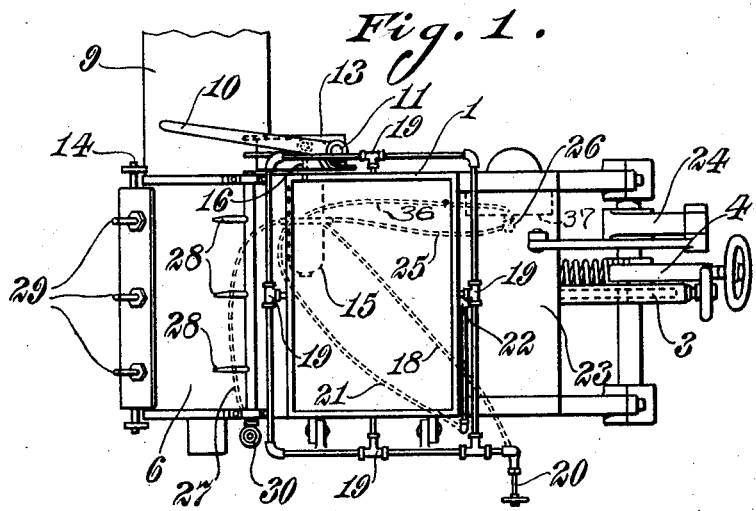
Figure 1 is a plan view of a dough divider embodying this invention.
Figure 2:
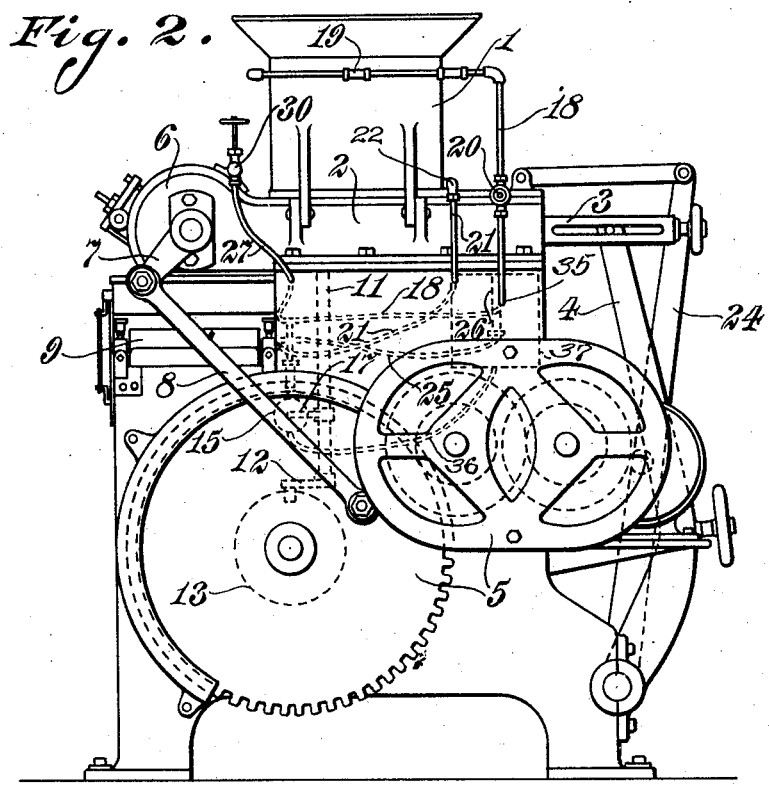
Figure 2 is a side elevation of the same.
Figure 3:
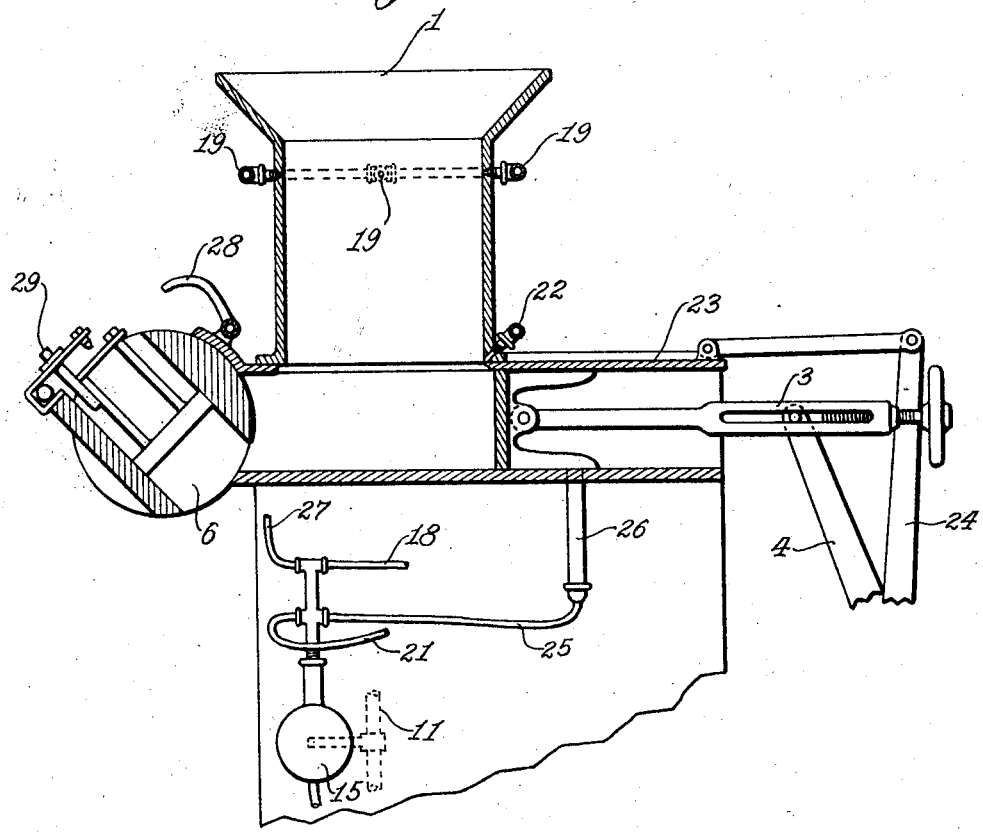
Figure 3 is a longitudinal section of part of Figure 2.

The machine illustrated in the drawing is a well known type of dough divider having a hopper 1 which feeds the dough to a charging chamber 2 within which a plunger 3 is reciprocated by a lever 4 operated by the driving mechanism 5 in any suitable manner. From the charging chamber 2 the dough is forced by the operation of the plunger 3 into the compartments of a dividing cylinder 6. The cylinder 6 usually has a number of compartments, in the present case 3, each of proper capacity to measure the proper quantity of dough to form one loaf of bread or similar baking article. After the dough has been forced into the compartments of the cylinder 6, said cylinder is rotated by a crank 7 operated by a link 8 connected with the driving mechanism 5. Such rotation of the cylinder 6 serves to cut off the measured quantities of dough in the compartments, at the same time turning those compartments until their openings face downwardly over a receiving belt 9 upon which the measured quantities of dough are then discharged by a suitable action of the machine. This discharge may be accomplished by a lever 10 mounted on a vertical shaft 11 having an arm 12 engaging a cam 13 on the driving mechanism.

The cam 13 serves to rock the shaft 11 at a suitable point in its rotation so as to swing the lever 10 which strikes a tappet 14 which in turn actuates suitable mechanism for discharging the dough. All of the above described mechanism is well known in the art, being found on well known standard types of dough handling machinery and will, therefore, require no detail description.

In accordance with this invention, an oil pump 15, preferably of the reciprocating type and supplied by a conduit 36 from an oil tank 37, is mounted at a convenient place on the machine and is provided with a plunger 16 adapted to engaging an arm 17 mounted on the vertical shaft 11. As the arm 17 rocks with the movement of the shaft 11, the pump will be actuated periodically in accordance with the operation of the machine. Oil conduits are arranged to lead from the pump 15 to various parts of the machine to lubricate the same.

A conduit 18 leads from the pump to the hopper 1, passing from inside to outside of the frame at 35 and connects to one or more oil jets 19 suitably placed so as to deliver oil to the hopper. A regulating valve 20 may be placed in the conduit 18 so that the flow of oil may be accurately adjusted.

A conduit 21 leads from the pump to an oil jet 22 which lubricates the cutting off knife 23 which operates to cut off the dough from the charging chamber 2. The lubrication of this knife is important since it is liable to clog with dough which, when it becomes hard, cements the knife so solidly to its guides that it has happened that the lever 24 which operates said knife has been broken in attempting to start up after an idle period.

A conduit 25 leads to an oil jet 26, discharging upwardly, which supplies the chamber 2 so as to lubricate the plunger 3.

A conduit 27 leads to a series of oil jets 28 mounted at the cylinder 6. There is one jet 28 for each of the measuring compartments of the cylinder 6 and opposite each jet there is mounted on the cylinder a wiper 29 which serves to wipe a drop of oil from the jet 28 at each operation of the cylinder. The wipers 29 may have the form of tubes leading into the measuring compartments so that the oil received thereby is conducted into said compartments. A regulating valve 30 in the conduit 27 serves to adjust the rate of feeding of the oil.

It will be seen that in accordance with this invention a lubricating system is provided by which oil is delivered to those parts of the machine which are liable to become clogged by the adhesion of dough thereto. The flow of dough through the hopper is lubricated by oil supplied to the hopper. Clogging of the knife 23 is avoided by proper lubrication of said knife. The chamber 2 is supplied with lubrication so that the plunger 3 will move freely at all times. The jets 28 and the wipers 29 serve to keep the measuring compartments properly lubricated so that there will be no lodgement of dough thereon.

It will also be noted that the lubrication of all of these devices is carried out in accordance with the operation of the machine. Accordingly, by proper adjustments just exactly the right amount of lubrication can be provided, a feature which not only prevents an excessive amount of lubrication being supplied to the dough but also works a great economy in the expenditure of lubricating oil. Operating the lubricating pump in accordance with the operation of the machine also provides that the machine may be shut down at any time without the necessity of shutting off the supply of lubricant, since this is accomplished automatically by stopping the machine. Accordingly, an adjustment once fixed can be maintained and the attendant is relieved of the necessity of making such adjustment every time the machine is started.

Since all parts of the machine which handle dough are lubricated there will be no adhesion of dough to the moving parts. Accordingly, the machine may be stopped and allowed to stand idle for any necessary period without danger of sticking and consequent liability of breakage when starting up again.

It is obvious that various changes may be made in details of construction without departing from the spirit of this invention; it is, therefore, to be understood that this invention is not to be limited to the specific details shown and described.

Having thus described the invention, what is claimed is:

1. In a dough-dividing machine of the type having a hopper, a reciprocating cutting-off knife, a dividing receiver and a plunger adapted to feed the receiver, dough lubricating means comprising an oil pump operated in accordance with the operation of the machine, oiling jets adapted to supply lubricant to the hopper, the knife, the plunger, and the receiver, and oil conduits connecting said pump with said jets.

2. In a dough-dividing machine of the type having a hopper, a reciprocating cutting-off knife and a dividing receiver fed by a plunger, dough lubricating means comprising an oil pump operated in accordance with the operation of the machine, oiling jets adapted to supply lubricant to the hopper, the knife, and the receiver, and oil conduits connecting said pump with said jets.

3. In a dough-dividing machine of the type having a hopper, a reciprocating cutting-off knife and a dividing receiver fed by a plunger and moving from receiving to discharging position, dough lubricating means comprising an oil pump operated in accordance with the operation of the machine, an oiling jet adapted to supply lubricant to the receiver, a wiper moving with the receiver and adapted to take oil from said jet, and an oil conduit connecting said pump with said jet.

4. In a dough-dividing machine of the type having a hopper, a reciprocating cutting-off knife and a dividing receiver fed by a plunger, dough lubricating means comprising a positive-pressure oil pump operated in accordance with the operation of the machine, oiling jets adapted to supply oil under pressure to the knife and the receiver, and oil conduits connecting said pump with said jets.

5. In a dough-dividing machine of the type having a hopper, a reciprocating cutting-off knife and a dividing receiver fed by a plunger, dough lubricating means comprising a positive-pressure oil pump operated in accordance with the operation of the machine, an oiling jet adapted to supply oil under pressure to the knife, and an oil conduit connecting said pump with said jet.

In testimony whereof I affix my signature this 8th day of October, 1925.

CHARLES L. RUSSELL.